US008017560B2

(12) United States Patent
Pfeiffer et al.

(10) Patent No.: US 8,017,560 B2
(45) Date of Patent: Sep. 13, 2011

(54) FAST DISSOLVING HYDROXYALKYL GUAR DERIVATIVES

(75) Inventors: Ugo Pfeiffer, Milan (IT); Morano Gatto, Parabiago (IT); Mauro Tenconi, Gazzada (IT); Laura Vigano, Parabiago (IT); Andrea Balestrini, Sugar Land, TX (US); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 987 days.

(21) Appl. No.: 11/573,177

(22) PCT Filed: Jul. 29, 2005

(86) PCT No.: PCT/EP2005/053714
§ 371 (c)(1),
(2), (4) Date: Feb. 2, 2007

(87) PCT Pub. No.: WO2006/013190
PCT Pub. Date: Feb. 9, 2006

(65) Prior Publication Data
US 2007/0213230 A1    Sep. 13, 2007

(30) Foreign Application Priority Data
Aug. 5, 2004  (IT) .............. VA2004A0031

(51) Int. Cl.
*C09K 8/588* (2006.01)
*C09K 8/90* (2006.01)

(52) U.S. Cl. ........ 507/217; 507/209; 507/211; 507/261; 507/266; 507/268; 166/305.1

(58) Field of Classification Search ................. None
See application file for complete search history.

(56) References Cited

U.S. PATENT DOCUMENTS

| | | | | | |
|---|---|---|---|---|---|
| 2,854,407 | A | * | 9/1958 | Mallory | 507/110 |
| 5,233,032 | A | * | 8/1993 | Zody et al. | 536/114 |
| 5,256,651 | A | * | 10/1993 | Phelps et al. | 514/53 |
| 5,646,093 | A | * | 7/1997 | Dino | 507/209 |
| 5,720,347 | A | * | 2/1998 | Audibert et al. | 166/294 |
| 6,257,336 | B1 | * | 7/2001 | Audibert et al. | 166/293 |
| 6,387,853 | B1 | * | 5/2002 | Dawson et al. | 507/211 |
| 6,756,345 | B2 | * | 6/2004 | Pakulski et al. | 507/246 |
| 7,199,084 | B2 | * | 4/2007 | Parris et al. | 507/136 |
| 7,355,039 | B2 | * | 4/2008 | Rinaldi et al. | 536/123 |
| 2002/0019318 | A1 | * | 2/2002 | Harris | 507/200 |
| 2003/0221592 | A1 | * | 12/2003 | Sironi et al. | 106/805 |

FOREIGN PATENT DOCUMENTS

WO    WO 03078474 A1 *  9/2003

* cited by examiner

*Primary Examiner* — John J Figueroa
(74) *Attorney, Agent, or Firm* — Mossman, Kumar & Tyler, PC

(57) ABSTRACT

The present invention relates to hydrophobically modified hydroxyalkyl guar derivatives which dissolve rapidly in water, having a hydroxyalkyl molar substitution between 0.2 and 2.5 and containing hydrophobic groups comprising C10-C32 alkyl chains, to the procedure for their preparation and to their use in the formulation of well fluids.

20 Claims, No Drawings

FAST DISSOLVING HYDROXYALKYL GUAR DERIVATIVES

The present invention relates to hydroxyalkyl guar derivatives which dissolve rapidly in water and to the procedure for their preparation.

Hydroxyalkyl guar derivatives are obtained by chemical reaction of the hydroxyl groups of the galactomannan polysaccharide, which is normally known as "guar gum" or "guar", with alkylene oxides (ethylene, propylene, butylene or higher oxides), in the presence of an alkaline catalyst (such as sodium hydroxide).

Further substitution can be introduced by reaction with long chain epoxides or glycidyl ethers, to obtain hydrophobically modified hydroxyalkyl guar derivatives.

The hydroxyalkyl guar derivatives are used as thickeners in several industrial applications, such as, merely by way of example, in the preparation of printing pastes; in the silk-screen printing of textiles (cotton, wool, silk, etc.); in the formulation of water-based paints and varnishes; in the preparation of gypsum or cement based blends, wall coverings, adhesives for tiles; in the preparation of cleaning products or of cosmetics or personal care products, such as shampoos, hair conditioners, skin creams; in the paper industry; in oil and gas drilling and production; in the preparation of explosives; in the preparation of water-based solutions for fire fighting.

Hydroxyalkyl guar derivatives, such as hydroxypropyl guar and hydroxypropyl guar derivatives, are usually commercialised in the form of powder.

It is well known that many problems are encountered while dissolving water soluble polysaccharides, such as the formation of lumps and the time that water needs to fully hydrate the particles.

Various methods have also been proposed by prior art publications which in principle suggest preventing or retarding initial swelling of surfaces of the polysaccharide particles until the particles are uniformly dispersed in water, to avoid the formation of lumps; among these methods, reversible cross-linking of the polysaccharide is one of the most commonly used.

U.S. Pat. No. 3,297,583 (HENKEL) Oct. 1, 1967, for example, describes a process for the rapid and lump-free dissolution in water of pre-treated water soluble macromolecular substances, such as guar gum (guarana flour); the proposed pre-treatment is a reversible cross-linking with aldehydes.

Another kind of well known reversible cross-linking is cross-linking with boric acid.

The effective use of such cross-linking treatments to properly help the dissolution of polysaccharides is strongly dependent upon the control of pH of the aqueous media and clearly involves the use of external and often undesired substances (boric acid, glyoxal).

However, and even when cross-linking successfully help avoiding the formation of lumps, there still exist the need of hydroxyalkyl guar derivatives showing shorter dissolution (hydration time), and achieving rapidly the final desired degree of viscosity in a large range of pH.

This need is particularly felt in the field of oil production and more precisely in fracturing, where hydrophobically modified hydroxyalkyl guar derivatives are used, often together with associative surfactants, to obtain viscous aqueous solutions which are injected under pressure into the bore wells.

Due to the fact that viscous solutions are mainly prepared in sort of reservoirs next to where operations take place and are immediately used, it is of the greatest importance to rapidly dissolve their components in order to shorten the operation time.

Attempts to improve the rate of dissolution in water of hydrophobically modified hydroxyalkyl guar derivatives by reducing their average particle size by milling and/or sieving were undertaken, but insufficient results were obtained: the rate of dissolution was actually improved but to a too little extent.

In all cases, i.e. by sieving and/or milling with conventional equipments, the obtained dissolution time are not as short as the dissolution time of the hydrophobically modified hydroxyalkyl guar derivatives of the invention, even when the particle size distribution of the tested samples is similar.

The results obtained reducing the particle size of hydroxyalkyl guar derivatives by sieving suggested that the average particle size of hydroxyalkyl guar derivatives was not as critical as expected when considering the rate of dissolution in water; other features, such as the well known tendency to agglomeration possessed by smaller particles and other phenomena, are to be taken into account.

It has now surprisingly been found, and it is a fundamental object of the present invention, that a fast dissolving hydrophobically modified hydroxyalkyl guar derivative is obtained when guar flour having at least 96 wt % of particles passing through a 230 mesh sieve is used as the starting material (in the present text also mentioned as "fine guar flour").

In the present text, with the expression "fast dissolving hydrophobically modified hydroxyalkyl guar derivative" we mean a hydrophobically modified hydroxyalkyl guar derivative having a dissolution time equal or lower than 30 minutes.

The dissolution time is determined by continuously measuring the viscosity of a stirred aqueous solution comprising 0.72% of hydrophobically modified hydroxyalkyl guar derivative and is defined as the time in minutes which elapses from the beginning of measurements before 80% of the maximum viscosity is reached.

It is therefore an object of the invention the procedure for the preparation of fast dissolving hydrophobically modified hydroxyalkyl guar derivatives having a molar hydroxyalkyl substitution between 0.2 and 2.5, preferably between 0.8 and 1.7, and containing an average of from $10^{-5}$ to $10^{-1}$ of hydrophobic groups per anhydroglycosidic unit comprising a $C_{10}$-$C_{32}$ alkyl chain, the procedure comprising the following steps:

a) guar flour is sieved and/or milled until a guar flour is obtained having at least 96 wt % of its particles passing through a 230 mesh sieve;

b) the obtained fine guar flour is treated with an aqueous alkaline hydroxide and is reacted with an alkylene oxide, preferably selected among ethylene oxide, propylene oxide, butylene oxide and mixture thereof;

c) an hydrophobising agent is introduced into the reaction mixture, possibly dispersed in an organic diluent, preferably isopropanol, and the reaction is completed;

d) the alkaline hydroxide is neutralised, the possible organic diluent is distilled off and the product obtained is dried, ground and sieved to obtain a fast dissolving hydrophobically modified hydroxyalkyl guar derivative having at least 95 wt % of particles passing through a 100 mesh sieve and at least 35 wt % of particles retained on a 400 mesh sieve. For the purposes of the present invention, the term anhydroglycosidic unit has the same meaning as the term glycoside.

The treatment with the aqueous alkaline hydroxide of step b) is preferably made at ambient temperature; the reaction with the alkylene oxide is preferably carried at a temperature of between 30 and 80° C. for a time of between 1 and 3 hours.

Before introducing the hydrophobising agent, preferably the reaction mixture is cooled to about 40° C. and the reaction of step c) is completed by raising the temperature to 50-80° C. for 2-6 hours.

Preferably the hydrophobising agent is selected from the group of fatty alkyl or alkenylketene dimers and of the compounds having the following general formula:

wherein m is from 0 to 20,
X is Cl, Br, $OSO_2R^1$, wherein $R^1=C_1-C_3$ alkyl group, $C_6-C_{12}$ aryl group or $C_7$ arylalkyl group, or X is

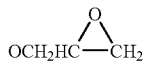

and, when m=0, X is

R=linear or branched $C_1-C_{32}$ alkyl or alkenyl group
A=O—$C_pH_{2p}$ oxyalkylene group, linear or branched with p=2-10.

More preferably the hydrobizing agent is a $C_{10}-C_{32}$ alkyl glycidylether.

The guar flour useful for obtaining the hydrophobically modified hydroxyalkyl guar derivative of the invention has a molecular weight of between 50,000 and 2,500,000 and Brookfield viscosity at 20° C., 20 rpm and 1% comprised between 10 and 20,000 mPa*s, preferably between 50 and 10,000 mPa*s.

It is a further object of the present invention a hydrophobically modified hydroxyalkyl guar derivative having a hydroxyalkyl molar substitution between 0.2 and 2.5, preferably between 0.8 and 1.7, and containing hydrophobic groups comprising $C_{10}-C_{32}$ alkyl chains, characterised by the fact of being fast dissolving and having at least 95 wt % of particles passing through a 100 mesh sieve and at least 35 wt % of particles retained on a 400 mesh sieve.

The expression "molar substitution" (MS) means the average number of moles of substituents for each anhydroglycosidic unit of the galactomannan.

Preferably, the hydrophobically modified hydroxyalkyl guar derivative of the invention is selected in the group consisting of hydroxypropyl guar, hydroxyethyl guar and hydroxybutyl guar containing an average of from $10^{-5}$ to $10^{-1}$ of hydrophobic groups per anhydroglycosidic unit.

When comparing hydrophobically modified hydroxyalkyl guar derivatives obtained from guar flour having at least 96 wt % of particles passing through a 230 mesh sieve with hydrophobically modified hydroxyalkyl guar derivatives obtained from standard commercially available guar flour or guar splits, it is observed that the previous have an average particle size smaller than the latter; that is, the average particle size of the starting material influences the average particle size of the derived product, even if the reactions occur on guar flour which is swollen with water.

Unexpectedly, when both the above mentioned derived products are sieved and sieved fractions having the same particle-size are compared in relation to their rate of dissolution in water, it is further observed that the dissolution rate is notably higher for derivatives obtained from sieved guar having at least 96 wt % of particles passing through a 230 mesh sieve; that is, unexpectedly, the better dissolution time is not only due to the reduced particle size.

A possible explanation of this phenomenon is that the average particle size of the starting material might positively influence the distribution along the polygalactoamannan chains of the hydroxyalkyl and hydrophobic substituents.

The hydrophobically modified hydroxyalkyl guar derivatives of the invention are particularly useful as ingredients of well fluids such as: oil well drilling and drill-in fluids, completion and workover fluids, cement slurries, well treating (e.g. hydraulic fracturing) fluids or foams.

It is a further object of the invention a method of treating a subterranean formation using a well fluid the method comprising: (i) preparing the well-treating, or the completion, or the workover, or the drilling fluid or the drill-in fluid by admixing the hydrophobically modified hydroxyalkyl guar derivative of the invention to a well fluid in an amount of from about 0.05 to about 1.0 wt %; (ii) dissolving the fast dissolving hydrophobically modified hydroxyalkyl guar derivative of the invention; (iii) introducing the well fluid to the wellbore at a temperature and a pressure sufficient to treat the subterranean formation.

The well fluid contains water or brine and the normally used additives, well known by the people skilled in the art; the order in which the additives and the product of the invention are added into the well fluid is not critical.

The fast dissolving characteristic of the hydrophobically modified hydroxyalkyl guar derivatives of the present invention, is valuable and beneficial not only in the field of application of oil recovery, but also in any application in which hydrophobically modified hydroxyalkyl guar derivatives are conventionally employed, such as, merely as an example, in the textile printing, paper manufacturing, paint and varnishes formulation, building industries, explosive manufacture, ceramics, mining operations, cosmetics and detergents formulations, and many other.

In the following examples the following methods were used:

Particle Size Determination.

The particle size determination is made with ASTM standard sieves on 50 g of product, using a mechanical sieve shaker, and shaking for 60 minutes.

Dissolution Time Determination.

A method based on continuos viscosity readings is used to test the dissolution time (or hydration time) of both guar gum and hydrophobically modified hydroxyalkyl guar derivatives.

900 ml of de-ionised water are prepared in a 1 l beaker. A rotational viscosimeter (as described in API RP13B-2, e.g. FANN mod. 35) is equipped with spring with factor F=0.2. The rotor of the viscosimeter is immersed into the de-ionised water, as well as a 4 blade impeller, diameter 6 cm (Waring blender mod. impeller) connected to a stirrer by means of a suitable shaft. The polymer solution is prepared directly in the described assembly at a stirring speed of the impeller blade of 2000 rpm.

The polymer concentrations are of 0.72% w/v.

The viscosimeter readings @300 rpm are recorded each minute, starting from the end of the addition of the polymer, for the first ten minutes; then the readings are recorded each 5 minutes up to a total stirring time of 30 minutes and then each 30 minutes up to a total stirring time of 2 hours. For all the duration of the test, both the stirrer and the viscosimeter are operated and have not to be switched off.

Calculation.

The viscosity is equal to the viscometer reading divided by 5.

The viscosity determined after 2 hours is conventionally assumed as the maximum value achievable and is set as 100%. The viscosity values determined at different times can be expressed as a percentage of the maximum value.

The dissolution time is defined as the time in minutes which elapses from the beginning of measurements before 80% of the maximum viscosity is reached.

EXAMPLE 1

Commercial guar flour having about 90 wt % of particles passing through a 230 mesh sieve and having Brookfield viscosity RVT at 20° C., 20 rpm and 1% of 5000 mPa*s, is sieved to obtain 100 g of fine guar flour having 99 wt % of particles passing through a 230 mesh sieve.

The fine guar flour is fed into a suitable steel reactor able to resist pressures up to 10 atm, evacuated and filled three times with nitrogen and then mixed carefully with 4 g of sodium hydroxide dissolved in 32 g of water. After 15 minutes of stirring at 20° C., 13 g of propylene oxide are added and the mixture is heated to 70° C. over a period of 30 minutes, then 38 g of propylene oxide are added in 30 minutes.

This temperature is kept for 1 hour under constant stirring.

The mixture is cooled to 40° C., and 0.17 g of $C_{22}$ alkyl glycidylether dispersed in 27 ml of hot isopropanol are added.

The mixture is mixed until homogeneity and is heated to 70° C. for 3 hours.

On completion of the reaction the reaction mixture is cooled to 40° C., neutralised to pH 7, the product is filtered off under vacuum and dried in a hot air stream at 85-90° C. for 20 minutes, ground and sieved through a 100 mesh sieve.

A hydrophobically modified hydroxypropyl guar derivative (HMHPG1) is obtained having hydroxypropyl molar substitution of 1.3, hydrophobic molar substitution of $4\times10^{-4}$ and dissolution time of 10' 30".

The particle size determination resulted in 100 wt % of particles passing through a 100 mesh sieve, 9 wt % retained on a 230 mesh sieve, 39 wt % passing through 230 mesh sieve and retained on 400 mesh sieve, 52 wt % of particles passing through a 400 mesh sieve.

EXAMPLE 2

Comparative

A hydrophobically modified hydroxypropyl guar derivative is prepared starting from commercial guar flour having about 90 wt % of particles passing through a 230 mesh sieve, having Brookfield viscosity RVT at 20° C., 20 rpm and 1% of 5000 mPa*s with the procedure described in Example 1, but without sieving the guar flour.

A hydrophobically modified hydroxypropyl guar derivative (HMHPG2) is obtained having hydroxypropyl molar substitution of 1.3, hydrophobic molar substitution of $4\times10^{-4}$ and dissolution time of 60'.

The particle size determination resulted in 100 wt % of particles passing through a 100 mesh sieve, 20 wt % retained on a 230 mesh sieve, 34 wt % passing through 230 mesh sieve and retained on 400 mesh sieve, 46 wt % of particles passing through a 400 mesh sieve.

EXAMPLE 3

The hydrophobically modified hydroxypropyl guar of Example 1 (HMHPG1) is sieved under 230 mesh, to obtain HMHPG1s having the following particle size:

100 wt % of particles pass through a 230 mesh sieve and 43 wt % are retained on a 400 mesh sieve.

The dissolution time of HMHPG1s is 9'30".

EXAMPLE 4

Comparative

The hydrophobically modified hydroxypropyl guar of Example 2 (HMHPG2) is sieved under 230 mesh, to obtain HMHPG2s having the following particle size:

100 wt % of particles pass through a 230 mesh sieve and 43 wt % are retained on a 400 mesh sieve.

The dissolution time of HMHPG2s is 52'.

It is therefore apparent that even if HMPG1s and HMHPG2s have the same particle size, HMPG1s is much more fast dissolving than HMPG2s. Only the products prepared according to the procedure of the invention (HMPG1 and HMHPG1s) possess the combined features of particle size and fast dissolving ability which are characteristics of the hydrophobically modified hydroxyalkyl guar derivative of the invention.

The invention claimed is:

1. A composition comprising a hydrophobically modified hydroxyalkyl guar derivative
    having a hydroxyalkyl molar substitution of from about 0.2 to about 2.5; and
    containing hydrophobic groups comprising a $C_{10}$-$C_{32}$ alkyl chain;
  wherein
    the hydrophobically modified hydroxyalkyl guar derivative:
    is fast dissolving;
    has at least 95 wt % of particles passing through a 100 mesh sieve;
    has at least 35 wt % of the particles retained on a 400 mesh sieve; is obtained from guar flour as starting material having at least 96 wt % of its particles passing through a 230 mesh sieve; and has a dissolution time equal to, or lower than, 30 minutes.

2. The composition of claim 1 wherein the hydrophobically modified hydroxyalkyl guar derivative has a molar hydroxyalkyl substitution of from about 0.8 to about 1.7.

3. The composition of claim 1 wherein the hydroxyalkyl is selected from the group consisting of hydroxypropyl, hydroxyethyl, hydroxybutyl, and mixtures thereof.

4. The composition of claim 3 wherein the hydroxyalkyl is a hydroxypropyl group.

5. The composition of claim 1 wherein the hydrophobically modified hydroxyalkyl guar derivative contains an average of from about $10^{-5}$ to about $10^{-1}$ hydrophobic groups per anhydroglycosidic unit.

6. The composition of claim 1 wherein the hydrophobic groups are $C_{22}$ groups.

7. The composition of claim 1 wherein the composition is prepared using a fine guar flour that has a molecular weight of from about 50,000 to about 2,500,000 and a Brookfield viscosity at 20° C., 20 rpm and 1 wt % of from about 10 to about 20,000 mPa*s.

8. A procedure for the preparation of fast dissolving hydrophobically modified hydroxyalkyl guar derivatives having a hydroxyalkyl molar substitution of from about 0.2 to about 2.5 and containing an average of from about $10^{-5}$ to about $10^{-1}$ hydrophobic groups per anhydroglycosidic unit comprising C10-C32 alkyl chains, the procedure comprising the steps of:

a) sieving and/or milling a guar flour until at least 96 wt % of its particles pass through a 230 mesh sieve to produce a fine guar flour;

b) treating the fine guar flour with an aqueous alkaline hydroxide and then reacting the fine guar flour with an alkylene oxide to produce a first reaction mixture;

c) introducing a hydrophobizing agent into the first reaction mixture and allowing the reaction is allow to proceed to finish to produce a second reaction mixture; and d) neutralizing the alkaline hydroxide in the second reaction mixture.

9. The procedure of claim 8 additionally comprising drying and then grinding and/or sieving the product of step d) to obtain a fast dissolving hydrophobically modified hydroxyalkyl guar derivative having at least 95 wt % of particles passing through a 100 mesh sieve and at least 35 wt % of particles retained on a 400 mesh sieve.

10. The procedure of claim 8 wherein the hydrophobizing agent is dispersed in an organic diluent.

11. The procedure of claim 10 wherein step d) additionally comprises distilling off the organic diluent.

12. The procedure of claim 8 wherein the molar hydroxyalkyl substitution is from about 0.8 to about 1.7.

13. The procedure of claim 8 wherein the alkylene oxide is selected from the group consisting of ethylene oxide, propylene oxide, butylene oxide, and mixtures thereof.

14. The procedure of claim 13 wherein the alkylene oxide is propylene oxide.

15. The procedure of claim 10 wherein the organic diluent is isopropanol.

16. The procedure of claim 8 wherein the hydrophobising agent is a $C_{10}$-$C_{32}$ alkyl glycidylether.

17. The procedure of claim 8 wherein the fine guar flour of step a) has a molecular weight of from about 50,000 to about 2,500,000 and a Brookfield viscosity at 20° C., 20 rpm and 1 wt % of from about 10 to about 20,000 mPa*s.

18. A method for treating a subterranean formation using a well fluid comprising the step of:

preparing a well-treating, completion, workover, drilling fluid or drill-in fluid by admixing a hydrophobically modified hydroxyalkyl guar derivative of claim 11 with the well-treating, completion, workover, drilling fluid or drill-in fluid in an amount of from about 0.05 to about 1.0 wt %;

(ii) dissolving the fast dissolving hydrophobically modified hydroxyalkyl guar derivative; and (iii) introducing the well fluid into the wellbore at a temperature and a pressure sufficient to treat the subterranean formation.

19. The method of claim 18 wherein the hydrophobically modified hydroxyalkyl guar derivative has a molar hydroxyalkyl substitution of from about 0.8 to about 1.7.

20. The method of claim 18 wherein the hydrophobically modified hydroxyalkyl guar derivative contains an average of from about $10^{-5}$ to about $10^{-1}$ hydrophobic groups per anhydroglycosidic unit.

* * * * *